United States Patent Office 3,489,823
Patented Jan. 13, 1970

3,489,823
PRODUCTION OF STEREO BLOCK
BUTADIENE POLYMER
Herbert Naarmann, Ludwigshafen (Rhine), and Ernst-Guenther Kastning, Assenheim, Germany, assignors to Badische Anilin- & Soda-Fabrik Aktiengesellschaft, Ludwigshafen (Rhine), Germany
No Drawing. Filed Apr. 27, 1966, Ser. No. 545,558
Claims priority, application Germany, May 4, 1965,
B 81,736
Int. Cl. C08f 3/18
U.S. Cl. 260—879   2 Claims

ABSTRACT OF THE DISCLOSURE

Process for the production of stereo block butadiene polymers by polymerization of butadiene, using a Ziegler type catalyst system, in two steps, wherein the first step yields a polybutadiene of substantially sterically uniform configuration and the second step yields a polybutadiene of the opposite configuration. New elastomeric polybutadienes are formed which have excellent absorptives capacity for oil, good miscibility with other rubbers and/or fillers, superior strength in the unloaded condition after vulcanization, etc.

The present invention relates to a process for the production of butadiene polymers by polymerization of butadiene using catalysts of compounds of transition metals of groups IV to VIII of the Periodic System of Elements and alkylmetal compounds.

Polymerization of butadiene with Ziegler-Natta catalysts is known. Ziegler-Natta catalysts are those composed of compounds of transition metals of Groups IV to VII of the Periodic System of Elements and organometallic compounds. The transition metal compounds are derived mainly from metals of groups IV, V and VIII and compounds of titanium, vanadium and cobalt, particularly their halides and complex compounds. Alkylaluminum compounds, which may contain halogen atoms attached to the aluminum atoms, have acquired special importance as the organometallic compounds.

The polybutadienes obtained according to this method are stereo-regular in configuration and depending on the catalyst used will contain a 1,4-cis fraction of more than 90%, a 1,2-vinyl fraction in isotactic or syndiotactic arrangement of more than 90%, or a 1,4- trans fraction of more than 90%. For example, 1,4-trans-polybutadiene is obtained with catalysts of (a) titanium chlorides and vanadium halides and (b) trialkylaluminum compounds, but 1,4-cis-polybutadiene with catalysts of (a) titanium iodide and (b) trialkylaluminum compounds or alkyl lithium compounds, this product also being obtained with (a) cobalt compounds, such as cobalt chloride, cobalt acetylacetonate and cobalt carbonyl compounds, and (b) alkylaluminum dihalides, such as ethylaluminum dichloride.

The various polybutadienes have some disadvantages as regards their further processing, their behavior in rolling and mixing and the quality of the shaped articles prepared therefrom by vulcanization. For example 1,4-cis-polybutadiene is obtained by polymerization in an amorphous form and has a melting point range of about −100° C.; by protracted crystallization a product is obtained which melts at about −20° C.

1,2-polybutadiene can only be prepared with a relatively low molecular weight and the vulcanized final product does not reach the strength values, usual for conventional rubber, of at least 100 kg./sq. cm. and elongation values of at least 300 %. Moreover its properties at low temperatures are inferior.

1,4-trans-polybutadiene can only be processed on rollers with great difficulty because it is very brittle and after having been vulcanized also does not reach the elongation and elasticity of conventional rubber vulcanizates. Its Shore hardness on the other hand is too high. Mixtures of 1,4-cis-polybutadiene and 1,4-trans-polybutadiene have inferior properties in the vulcanized condition to those of vulcanized 1,4-cis-polybutadienes.

We have now found that butadiene polymers can be prepared particularly advantageously by polymerization of butadiene using catalysts of compounds of transition metals of Groups IV to VIII of the Periodic System of Elements by adding to a solution of a practically unbranched sterically unitary polybutadiene which still contains active catalyst, in the presence of butadiene, a catalyst of the same type but which converts butadiene into a polymer whose configuration is opposite to the configuration of the polybutadiene first prepared in the solution, and then continuing the polymerization.

Accordingly the object of the present invention is to provide a process for the production of butadiene polymers by polymerization of butadiene using catalysts of compounds of transition metals of Groups IV to VIII of the Periodic System of Elements and alkyl metal compounds, and according to the invention there is added to a solution of a practically unbranched sterically unitary polybutadiene which contains active catalyst, in the presence of butadiene, a catalyst of the same type but which converts butadiene into a polymer whose configuration is opposite to the configuration of the polybutadiene first prepared in solution, and polymerization is then continued.

In the process according to this invention there is first prepared in the usual way a practically unbranched sterically unitary polybutadiene, for example, 1,4-cis-polybutadiene having a K value of preferably 20 to 80, in solution and there is added to the resultant solution immediately after it has been prepared (i.e. while active catalyst and unreacted butadiene are still present in the solution) a catalyst of the same type but which polymerizes butadiene for example into 1,4-trans-polybutadiene. It is advantageous to choose reaction conditions such that the polymer obtained has a proportion of 25 to 90% of unbranched unitary cis-structure. The amount of catalysts used in the second stage of the process is in general the same as the amount of catalyst used in the first stage. The continued polymerization is usually stopped only when a K value of at least 80 has been achieved, and K values of the end product of 85 to 120 are of special interest.

The products obtained by the new process are clearly different from the prior art unitary 1,4-cis-polybutadienes and 1,4-trans-polybutadienes and other conventional polybutadienes and from mixtures of 1,4-cis-polybutadienes and 1,4-trans-polybutadienes. They are probably stereo block polymers.

The new elastomeric polybutadienes have melting ranges of +30° C. They are greatly superior to polybutadienes prepared by conventional methods in their strength in the unloaded condition after vulcanization. Moreover they have excellent absorptive capacity for oil, good behavior when rolled and good miscibility with other rubbers and/or fillers.

The catalyst systems may be those with which 1,4-cis-polybutadienes or 1,4-trans-polybutadienes may be prepared in solution with a steric fraction of at least 90% in each case.

Preferred catalysts for the production of 1,4-cis-polybutadienes are mixtures of alkylaluminum compounds, such as triethylaluminum, and halotitanium compounds, such as titanium tetraiodide; triethylaluminum with titanium tetraiodide and isopropyl ether; mixtures of diethylaluminum monochloride with cobalt compounds, such as cobalt(II) acetylacetonate; and mixtures of alkyllithium compounds, such as butyllithium and titanium tetraiodide.

Particularly suitable catalysts for the production of 1,4-trans-polybutadienes are triethylaluminum with vanadium halides, such as vanadium trichloride, vanadium tetrachloride and vanadium oxychlorides. The molar ratio of the transition metal compounds to the alkyl metal compounds is in general from 0.1:1 to 10:1, preferably 0.5:1. The amount of any activating additives used, such as ethers, amines, alcohols or water, is in the same order of magnitude as the amount of catalyst. The concentration of the catalyst is in general 0.01 to 0.1% by weight on the monomers.

The polymerization temperature is in general from —65° C. to +80° C., preferably below 0° C. and usually from —45° to —5° C.

Polymerization with these catalysts may be carried out in indifferent liquids as usual. Examples of liquids which are suitable for the purpose are saturated aliphatic, cycloaliphatic and/or aromatic hydrocarbons such as n-pentane, n-hexane, isohexane, n-heptane, n-octane, iso-octane, cyclohexane, methylcyclohexane, benzene, tetrahydronaphthalene and decahydronaphthalene, and halogen derivatives of these hydrocarbons, such as chloroform, bromobenzene and methylene chloride, which are however preferably used in addition to the other liquids, the proportion thereof being not more than 10% by weight on the total amount of solvent.

The process according to this invention may be carried out continuously or batchwise. The products obtained according to the process are suitable for the production of molded articles, such as motor tires, with vulcanization, for blending for example natural rubber or other conventional rubbers, such as copolymers of butadiene with styrene and/or acrylonitrile, and for the production of impact resistant compositions and they are distinguished by high absorptive power for oils and fillers, such as carbon black and silicic acid. The high tensile strength and elongation of the vulcanizates in the unloaded condition is remarkable.

The following examples will illustrate the invention, the K values in the examples having been determined in 0.5% solution in benzene by the method of H. Fikentscher, "Cellulosechemie," 13, 58 (1932).

EXAMPLE 1

0.03 ml./liter of triethylaluminum, 0.005 g./liter of aluminum tribromide and 0.005 g./liter of titanium tetraiodide are added to a mixture of 10,000 parts of dry cyclohexane and 100 parts of butadiene which has been dried over lithium aluminum hydride, and polymerization is carried on for ten hours. The K value of the polymer obtained is 76 and its 1,4-cis fraction is 90%. A solution of 0.5 part of triethylaluminum and 0.2 part of vanadium trichloride and 1,000 parts of butadiene in 2,500 parts of benzene is added to the said polymer solution in the course of five hours and the reaction solution is kept at —5° C. for another three hours. The product is worked up in the usual way and 165 parts of polybutadiene having the K value 97 is obtained which has a crystalline fraction of 11%, a 1,4-cis fraction of 73% and a 1,4-trans fraction of 27%. It has a Mooney value of 48, ML4', 100° C., a tensile strength of 182 kg./sq. cm. in the loaded condition and 93 kg./sq. cm. in the unloaded condition.

EXAMPLE 2

The procedure of Example 1 is followed but a solution of 0.3 part of vanadium tetrachloride in the same amount of benzene is used instead of the solution of triethylaluminum and vanadium trichloride. 169 parts of polybutadiene having a K value of 94.5 is obtained which has a crystalline fraction of 13%, a 1,4-cis fraction of 71% and a 1,4-trans fraction of 27%.

EXAMPLE 3

0.03 part/liter of tri-(n-butyl)aluminum and 0.01 part per liter of α-titanium trichloride are added to a mixture of 10,000 parts of dry cyclohexane and 100 parts of dry butadiene and polymerization is carried on for ten hours at —30° C. The polymer solution thus obtained has added to it first 1,000 parts of butadiene and 1,000 parts of n-hexane and then in the course of five hours a solution of 0.001 part of α-titanium trichloride and 0.5 part of triethylaluminum iodide in 2,500 parts of benzene, and the reaction mixture is kept at —30° C. for another three hours. The mixture is then worked up as usual and 135 parts of polybutadiene is obtained which has a K value of 94.5, a crystalline fraction of 24%, a 1,4-cis fraction of 25%, a 1,4-trans fraction of 73% and a 1,2-vinyl fraction of 2%.

EXAMPLE 4

0.05 part/liter of di-n-butylaluminum monochloride and 0.01 part/liter of α-titanium trichloride are added to a mixture of 10,000 parts of dry cyclohexane and 100 parts of dry butadiene and polymerization is carried on for ten hours at —30° C. To the resultant polymer solution there are added first 1,000 parts of butadiene and 1,000 parts of n-hexane and then in the course of five hours a solution of 0.001 part of α-titanium chloride and 0.5 part of diethyl aluminum iodide in 2,500 parts of benzene and the reaction mixture is kept at —30° C. for another three hours. The product is worked up as usual and 143 parts of polybutadiene is obtained having a K value of 96, a crystalline fraction of 21%, a 1,4-cis fraction of 32%, a 1,4-trans fraction of 65% and a 1,2-vinyl fraction of 3%.

EXAMPLE 5

0.5 part/liter of triethylaluminum and 0.1 part/liter of titanium tetrachloride are added to a mixture of 10,000 parts of dry cyclohexane and 100 parts of dry butadiene and polymerization is carried on at —5° C. for five hours. To the resultant polymer solution there are added first 1,000 parts of butadiene and 1,000 parts of n-hexane and then in the course of five hours a solution of 0.001 part of α-titanium trichloride and 0.5 part of diethylaluminum iodide in 2,500 parts of benzene, and the reaction mixture is kept at —10° C. for another three hours. The product is worked up as usual and 152 parts of polybutadiene is obtained which has a K value of 93.5, a crystalline fraction of 19%, a 1,4-cis fraction of 36%, a 1,4-trans fraction of 62% and a 1,2-vinyl fraction of 2%.

EXAMPLE 6

0.3 part/liter of tri-n-butylaluminum and 0.2 part/liter of tri-n-butoxytitanium are added to a mixture of 10,000 parts of dry cyclohexane and 100 parts of dry butadiene and polymerization is carried on for ten hours at +20° C. To the resultant polymer solution there are added first 1,000 parts of butadiene and 1,000 parts of n-hexane and then in the course of five hours a solution of 0.5 part of triethylaluminum and 0.2 part of vanadium trichloride and 2,500 parts of benzene, and the reaction mixture is kept at +20° C. for another three hours. The product is worked up as usual and 168 parts of polybutadiene is obtained which has a K value of 91, a crystalline fraction of 29%, a 1,4-cis fraction of 3%, a 1,4-trans fraction of 62% and a 1,2-vinyl fraction of 35%.

EXAMPLE 7

0.5 part/liter of tri-n-butylaluminum and 0.15 part/liter of chromium triacetylacetonate are added to a mixture of 10,000 parts of dry cyclohexane and 50 parts of dry butadiene and polymerization is carried on for ten hours at +30° C. To the resultant polymer solution there are added first 150 parts of butadiene and 1,000 parts of n-hexane and then in the course of ten hours a solution of 0.4 part of tri-n-butylaluminum in 2,500 parts of benzene and the reaction mixture is kept at +30° C. for another three hours. The whole is then worked up as usual and 211 parts of polybutadiene having a K value of 97, a crystalline fraction of 15%, a 1,4-cis fraction of 9%, a 1,4-trans fraction of 58% and a 1,2-vinyl fraction of 33% is obtained.

EXAMPLE 8

0.5 part/liter of tri-n-butylaluminum and 0.15 part/liter of chromium tri-acetylacetonate are added to a mixture of 10,000 parts of dry cyclohexane and 50 parts of dry butadiene and polymerization is carried on for five hours at +60° C. To the resultant polymer solution there are added first 150 parts of butadiene and 1,000 parts of n-hexane and then in the course of ten hours a solution of 0.4 part of tri-n-butylaluminum in 2,500 parts of benzene and the reaction mixture is kept at +60° C. for another three hours. The product is worked up as usual and 219 parts of polybutadiene is obtained having a K value of 94, a crystalline fraction of 18%, a 1,4-cis fraction of 6%, a 1,4-trans fraction of 60% and a 1,2-vinyl fraction of 34%.

EXAMPLE 9

0.8 part/liter of tri-n-butylaluminum and 0.2 part/liter of vanadium triacetylacetonate are added to a mixture of 10,000 parts of dry cyclohexane and 50 parts of dry butadiene and polymerization is carried on for fifteen hours at +10° C. To the resultant polymer solution there are added first 150 parts of butadiene and 1,000 parts of n-hexane and then in the course of ten hours a solution of 0.9 part of tri-n-butylaluminum in 2,500 parts of benzene and the reaction mixture is kept at +10° C. for another three hours. The product is worked up and 184 parts of polybutadiene is obtained having a K value of 90.5, a crystalline fraction of 20%, a 1,4-cis fraction of 10%, a 1,4-trans fraction of 54% and a 1,2-vinyl fraction of 36%.

EXAMPLE 10

0.9 part/liter of tetra-n-butyl tin and 1.5 parts/liter of zirconium(IV) chloride are added to a mixture of 10,000 parts of dry cyclohexane and 150 parts of dry butadiene and polymerization is carried on for fifteen hours at +15° C. To the resultant polymer solution there are added first 150 parts of butadiene and 1,000 parts of n-hexane and then in the course of twenty hours a solution of 0.6 part of n-amyl sodium and 0.8 part of titanium(II) chloride in 2,500 parts of benzene and the reaction mixture is kept at +15° C. for another three hours. The whole is then worked up as usual and 156 parts of polybutadiene is obtained having a K value of 89, a crystalline fraction of 21%, a 1,4-cis fraction of 5%, a 1,4-trans fraction of 52% and a 1,2-vinyl fraction of 43%.

EXAMPLE 11

0.6 part/liter of tri-n-butylaluminum and 0.5 part/liter of vanadium trichloride are added to a mixture of 10,000 parts of dry cyclohexane and 150 parts of dry butadiene and polymerization is carried on for fifteen hours at +30° C. To the resultant polymer solution there are added first 1,000 parts of n-hexane and then in the course of twenty-five hours a solution of 1.2 parts of nickel tetracarbonyl and 10 parts of aluminum oxide in 2,500 parts of benzene and the reaction mixture is kept at +30° C. for another three hours. The product is worked up as usual and 194 parts of polybutadiene is obtained having a K value of 104.5, a crystalline fraction of 32%, a 1,4-cis fraction of 31%, a 1,4-trans fraction of 78% and a 1,2-vinyl fraction of 1%.

EXAMPLE 12

1.1 parts/liter of aluminum sesquichloride, 0.5 part/liter of cobalt(II) acetylacetonate and 0.01 part/liter of acetonitrile are added to a mixture of 10,000 parts of dry cyclohexane and 1.50 parts of dry butadiene and polymerization is carried out for eighteen hours at −10° C. To the resultant polymer solution, there are added first of all 150 parts of butadiene and 1,000 parts of n-hexane and then in the course of thirty hours a solution of 0.9 part of tri-n-butyl-aluminum and 0.5 part of titanium tetrachloride in 2,500 parts of benzene and the reaction mixture is kept at −10° C. for another three hours. The product is worked up as usual and 179 parts of polybutadiene is obtained having a K value of 101, a crystalline fraction of 24%, a 1,4-cis fraction of 35%, a 1,4-trans fraction of 62% and a 1,2-vinyl fraction of 3%.

EXAMPLE 13

If the reaction mixture described in Example 1 be filtered through aluminum oxide prior to stopping the polymerization and then another suspension of 0.3 part lithium aluminum hydride and 0.5 part of titanium tetraiodide in 100 parts of toluene be metered in, 50 parts of butadiene forced into the reaction mixture and the whole polymerized for twenty-five hours and the polymerization then stopped, 189 parts of a block polymer is obtained after the product has been worked up; the polymer has a K value of 109, a crystalline fraction of 9%, a 1,4-cis fraction of 84%, a 1,4-trans fraction of 15% and a 1,2-vinyl fraction of 1%. The tensile strength is 194 kg./sq. cm. in the loaded and 52 kg./sq. cm. in the unloaded condition.

EXAMPLE 14

The reaction mixture in Example 11 is filtered through aluminum oxide under nitrogen prior to stopping the polymerization and then 0.6 part of tri-n-butylaluminum and 0.5 part of vanadium trichloride with 50 parts of butadiene are metered in and polymerization is continued at −15° C. for another twenty-five hours. Polymerization is then stopped and the product is worked up as usual. 218 parts of a block polymer is obtained which contains 82% of 1,4-trans, 17% of 1,4-cis and 1% of 1,2-constituents. The Mooney value is 72 ML4', 100° C., the tensile strength is 194 kg./sq. cm. in the loaded condition and 112 kg./sq. cm. in the unloaded condition.

Vulcanization is carried out under the following conditions:

1 part of stearic acid, 50 parts of carbon black (CK3), 5 parts of zinc oxide, 1.5 parts of sulfur, 1 part of a commercial accelerator and 5 parts of a commercial extender are incorporated into 100 parts of polymer. Vulcanization is carried out at 143° C. for sixty minutes. The tensile strength is measured according to DIN 53,504.

The expression "loaded" or "unloaded" relates to a vulcanization mix which contains, or does not contain, carbon black.

We claim:
1. A process for the production of stereo block polymers of butadiene using a Ziegler type catalyst system which comprises: polymerizing 1,3-butadiene in solution at a temperature of from −65° to +80° C. using as the Ziegler type catalyst a halide or acetylacetonate of a transition metal of Groups IV to VIII of the Periodic System of Elements and a alkyl aluminum compound in two steps, said two steps being:
  (a) polymerization of said 1,3-butadiene in solution with a Ziegler type catalyst system which converts said 1,3-butadiene into a practically unbranched, 1,4-polybutadiene of substantially sterically uniform configuration having a K-value of 20 to 80,
  (b) adding to this solution which still contains unreacted 1,3-butadiene and active catalyst additional 1,3-butadiene and another Ziegler type catalyst system which system converts 1,3-butadiene into 1,4-polybutadiene the steric configuration of which is opposite to the configuration of the polybutadiene prepared in step (a), and thereafter continuing the polymerization until the end product has a K-value of 85–120, the amount of polymer being formed in each of steps (a) and (b) being controlled such that the polymer has a proportion of 25 to 90% of unbranched unitary cis-structure.

2. A process as in claim 1 wherein the polymerization is carried out at a temperature of from −45° to −5° C.

References Cited

UNITED STATES PATENTS

| | | | |
|---|---|---|---|
| 2,979,494 | 4/1961 | Stearns | 260—94.2 |
| 3,140,278 | 7/1964 | Kuntz | 260—94.2 |
| 3,211,710 | 10/1965 | Hendriks | 260—85.3 |
| 3,182,052 | 5/1965 | Naylor | 260—94.3 |
| 2,977,348 | 3/1961 | Tawney et al. | 260—94.3 |
| 2,977,349 | 3/1961 | Brockway et al. | 260—94.3 |
| 3,402,163 | 10/1968 | Schleimer et al. | 260—94.3 |

FOREIGN PATENTS

| | | |
|---|---|---|
| 992,210 | 5/1965 | Great Britain. |
| 647,034 | 8/1964 | Belgium. |

JOSEPH L. SCHOFER, Primary Examiner

W. F. HAMROCK, Assistant Examiner

U.S. Cl. X.R.

260—94.3, 94.7

PO-1050 (5/69)

UNITED STATES PATENT OFFICE
CERTIFICATE OF CORRECTION

Patent No. 3,489,823    Dated January 13, 1970

Inventor(s) Herbert Naarmann et al

It is certified that error appears in the above-identified patent and that said Letters Patent are hereby corrected as shown below:

Column 5, line 74, "1.50" should read "150".

SIGNED AND
SEALED
MAY 12 1970

(SEAL)
Attest:

Edward M. Fletcher, Jr.
Attesting Officer

WILLIAM E. SCHUYLER, JR.
Commissioner of Patents